United States Patent
Gorzelic et al.

(10) Patent No.: US 7,546,171 B2
(45) Date of Patent: Jun. 9, 2009

(54) METHOD, APPARATUS AND SYSTEM FOR RECOVERY OF A CONTROLLER WITH KNOWN-COMPATIBLE CONFIGURATION AND RUN-TIME DATA

(75) Inventors: Stanley R. Gorzelic, Bethlehem, PA (US); Robert V. Jones, Boyertown, PA (US); Cathleen F. Kilpatrick, Perkasie, PA (US); Sushma Srinivas, Pine Hill, NJ (US)

(73) Assignee: Honeywell International Inc., Morristown, NJ (US)

( * ) Notice: Subject to any disclaimer, the term of this patent is extended or adjusted under 35 U.S.C. 154(b) by 217 days.

(21) Appl. No.: 11/323,469

(22) Filed: Dec. 30, 2005

(65) Prior Publication Data

US 2007/0156263 A1 Jul. 5, 2007

(51) Int. Cl.
*G05B 9/02* (2006.01)
*G06F 11/00* (2006.01)

(52) U.S. Cl. .............................. 700/79; 714/13; 714/15
(58) Field of Classification Search .................. 700/86, 700/21, 79; 714/13, 15, 20
See application file for complete search history.

(56) References Cited

U.S. PATENT DOCUMENTS

| | | | |
|---|---|---|---|
| 5,576,946 A * | 11/1996 | Bender et al. ................. | 700/17 |
| 6,445,969 B1 * | 9/2002 | Kenney et al. ............. | 700/108 |
| 6,449,624 B1 * | 9/2002 | Hammack et al. ........... | 707/203 |
| 6,560,493 B1 * | 5/2003 | Dahleh et al. ................. | 700/28 |
| 7,117,052 B2 * | 10/2006 | Lucas et al. ................... | 700/83 |
| 2002/0002414 A1 * | 1/2002 | Hsiung et al. ................. | 700/95 |
| 2003/0046034 A1 | 3/2003 | Kitamoto et al. | |
| 2004/0103168 A1 | 3/2004 | Dalton et al. | |
| 2004/0194101 A1 * | 9/2004 | Glanzer et al. ............. | 718/100 |

FOREIGN PATENT DOCUMENTS

| | | |
|---|---|---|
| EP | 1669827 A2 | 6/2006 |
| EP | 1672451 A1 | 6/2006 |

OTHER PUBLICATIONS

"Find Names Command," Honeywell, Dec. 1995, 70 pages.
"Programmable Logic Controller Gateway Implementation Guidelines," Honeywell, esp. pp. 3-1, 3-11, Sep. 1997, 40 pages.
"Enhanced Programmable Logic Controller Gateway Implementation Guidelines," Honeywell, esp. pp. 3-1, 3-11, Sep. 1997, 46 pages.
"TPS Network Release 611 Customer Release Guide," Honeywell, Sep. 2000, esp. sections 5.6, 5.10, 7.5, 8.4, 10.13, 13.8, 13.12, 440 pages.
"Engineer's Reference Manual," Honeywell, esp. pp. 247-265, Sep. 1999, 516 pages.

* cited by examiner

*Primary Examiner*—Ryan A Jarrett
(74) *Attorney, Agent, or Firm*—Munck Carter, P.C.

(57) ABSTRACT

A method includes obtaining current structural information describing a current structure of a process control system and retrieving from a checkpoint file stored structural information describing a previous structure of the process control system. If the current structural information matches the stored structural information, current configuration and operational information of a controller in the process control system is conformed to previous configuration and operational information stored in the checkpoint file.

25 Claims, 5 Drawing Sheets

METHOD, APPARATUS AND SYSTEM FOR RECOVERY OF A CONTROLLER WITH KNOWN-COMPATIBLE CONFIGURATION AND RUN-TIME DATA

TECHNICAL FIELD

This disclosure relates generally to control systems and more specifically to a method, apparatus and system for recovery of a controller with known-compatible configuration and run-time data.

BACKGROUND

A modern industrial control and monitoring system typically includes one or more process controllers capable of controlling one or more process control elements. The process controller is typically implemented as one or more control modules, responsible for different aspects of the process control function. For example, a control module may control the pressure of a process with a data acquisition block that senses pressure and provides the measured pressure as an input to a control block executing a proportional-integral-derivative (PID) algorithm. The PID block may, in turn, generate output signals to control a valve actuator output block. The same control module may also have data acquisition/PID/output blocks sensing and controlling the temperature of the process.

An operator of a control system may save the current static control module or block configuration of the process controller in a snapshot file. When the configuration of the controller is changed, the snapshot file may be updated with the new configuration. If control modules or blocks of the control system subsequently fail or must otherwise be replaced, the previous configuration of the controller may be restored by loading configuration data from the snapshot file. However, in what is known as a "cold restart," the controller will initially be executing in manual mode. The operator will be required to reset operational parameters to return the controller to a fully operational state.

A checkpoint file, in contrast, contains data describing the static control module and block configuration of the control system as well as data describing the dynamic operational parameters of the control modules and blocks of the control system. This information may be temperature or pressure set points, alarm points, gain factors, or other such operational parameters of the process controller. When replacing or restarting a module or device, loading data from a checkpoint file allows not only the configuration of the controller to be restored, but also its operating characteristics. This allows the controller to be returned to a fully operational state, in what is known as a "warm restart."

However, there are structural elements of the process controller, such as graphical presentation elements, that are neither saved in, nor restored from, a checkpoint file. For example, the operator of an is industrial control system typically has a user interface presenting a view of several process controllers in the system. This user interface allows the operator to monitor the operation of the system. When only one process controller must be restored and restarted, its checkpoint file does not affect the monitor view presented to the operator.

Typically, when the configuration of a process controller is changed or loaded, for example by moving data acquisition/PID/output temperature control blocks from one control module to another, the monitor user interface view and other structural elements are also changed. This provides the operator with a consistent view of the control functions actually being performed by the process controller. However, if, after such a change to the configuration and structure has been made, the process controller is restarted by restoring it from a checkpoint file made before the change, problems may be created such as so-called "ghost points" or unresolved control connections.

An example of a "ghost point" is a restored control block in one control module of the process controller whose operation the operator can no longer monitor in the user interface. This is because the user interface structure indicates that the control block is now in another control module. An unresolved control connection occurs where a control block previously had a connection to another upstream or downstream control block, however that other control block no longer exists in the changed structure of the control system. In this situation, the operator's view of the connections between control blocks in the process controller is no longer consistent with the actual connections between control blocks.

SUMMARY

This disclosure provides a method, apparatus and system for recovery of a controller with known-compatible configuration and run-time data.

In a first embodiment, a method includes obtaining current structural information describing a current structure of a process control system. The method further includes retrieving from a checkpoint file stored structural information describing a previous structure of the process control system. The method also includes conforming current configuration and operational information of a controller in the process control system to previous configuration and operational information stored in the checkpoint file only if the current structural information matches the stored structural information.

In particular embodiments, the method further includes storing in the checkpoint file structural information describing a current structure of the process control system as the previous structure of the process control system. The method also includes storing in the checkpoint file current configuration and operational information of the controller as the previous configuration and operational information.

In a second embodiment, an apparatus includes a memory capable of storing a first checkpoint file. The first checkpoint file includes structural information describing a previous structure of a process control system and previous configuration and operational information of a process controller in the process control system. The apparatus also includes a checkpoint restore controller capable of obtaining current structural information describing a current structure of the process control system. The checkpoint restore controller is capable of retrieving from the first checkpoint file stored structural information describing a previous structure of the process control system. The checkpoint restore controller is also capable of conforming current configuration and operational information of the process controller to the previous configuration and operational information stored in the first checkpoint file only if the current structural information matches the stored structural information.

In particular embodiments, the apparatus also includes a checkpoint save controller capable of storing in the first checkpoint file structural information describing a current structure of the process control system as the previous structure of the process control system. The checkpoint save controller is also capable of storing in the first checkpoint file current configuration and operational information of the process controller as the previous configuration and operational information.

In a third embodiment, a system includes a process controller capable of controlling one or more process elements in a facility. The system also includes an apparatus that includes a memory capable of storing a first checkpoint file. The first checkpoint file includes structural information describing a previous structure of the system and previous configuration and operational information of the process controller. The apparatus also includes a checkpoint restore controller capable of obtaining current structural information describing a current structure of the system. The checkpoint restore controller is capable of retrieving from the first checkpoint file stored structural information describing a previous structure of the system. The checkpoint restore controller is also capable of conforming current configuration and operational information of the process controller to the previous configuration and operational information stored in the first checkpoint file only if the current structural information matches the stored structural information.

In particular embodiments, the apparatus of the system also includes a checkpoint save controller capable of storing in the first checkpoint file structural information describing a current structure of the system as the previous structure of the system. The checkpoint save controller is also capable of storing in the first checkpoint file current configuration and operational information of the process controller as the previous configuration and operational information.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
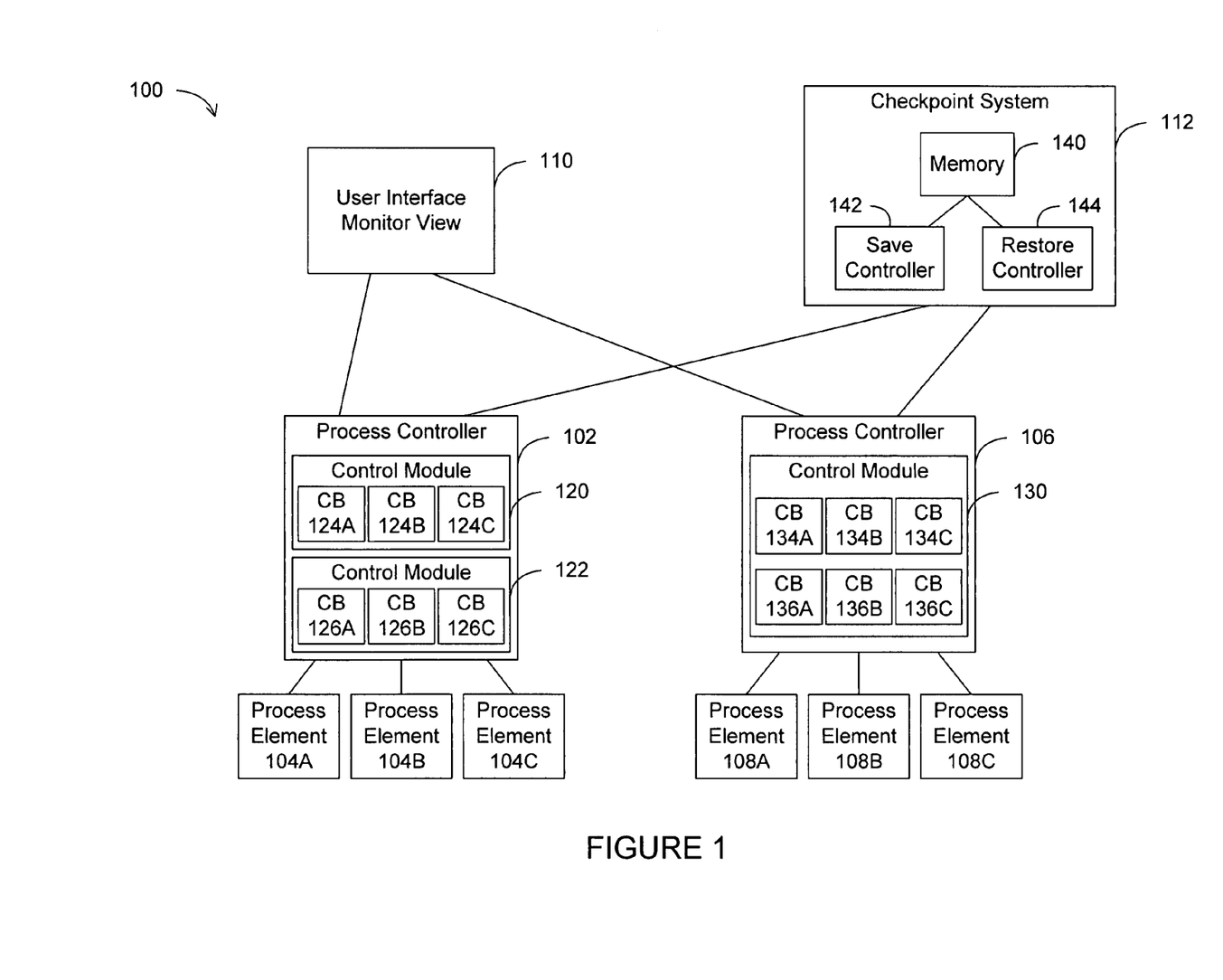
FIG. 1 illustrates an example system for industrial control and monitoring according to one embodiment of this disclosure.

FIG. 1 illustrates an example system 100 for industrial control and monitoring according to one embodiment of this disclosure. The embodiment of the system 100 shown in FIG. 1 is for illustration only. Other embodiments of the system 100 could be used without departing from the scope of this disclosure.

In this example, the system 100 includes a process controller 102 controlling process elements 104A-C. The system 100 also includes a process controller 106 controlling process elements 108A-C. The process elements 104A-C and 108A-C may be, for example, temperature sensors, pressure sensors, heater elements, and valve actuators. The process controller 102 may include control modules 120 is and 122. In this example, control module 120 includes control blocks 124A-C, and control module 122 includes control blocks 126A-C. In contrast, the process controller may include only control module 130, which includes control blocks 134A-C and 136A-C.

The system 100 may also include a user interface 110. The user interface 110 permits a system operator to monitor the system 100 by viewing the current state of the process controllers 102 and 106, and to control the operation of the system 100 by adjusting operational parameters of the process controllers 102 and 106.

The process controllers 102 and 106, the process elements 104A-C and 108A-C, and the user interface 110 are only some of the elements that may form an industrial control and monitoring system 100. Such a system may include other elements as well, without departing from the scope of this disclosure. Like such systems, industrial control and monitoring system 100 may be used in a wide variety of control applications, such as refineries, pulp and paper manufacturing, electrical power generation, batch reactor control, and others.

As shown in FIG. 1, the system 100 may further include a checkpoint system 112 according to an embodiment of this disclosure. The checkpoint system 112 may include a memory 140 for storing one or more checkpoint files, a save controller 142 for saving a checkpoint file containing the current configuration and operational information for a process controller, and a restore controller 144 for restoring a process controller to the configuration and operational condition stored in a checkpoint file.

The process controllers 102 and 106, the user interface 110 and the checkpoint system 112 may be co-resident on a single computer, or they may be resident on two or more computers and be interconnected by a communications network. The memory 140 may be co-resident with the save controller 142 and/or the restore controller 144, or it may be at a separate location or on removable storage media.

Figure 2:
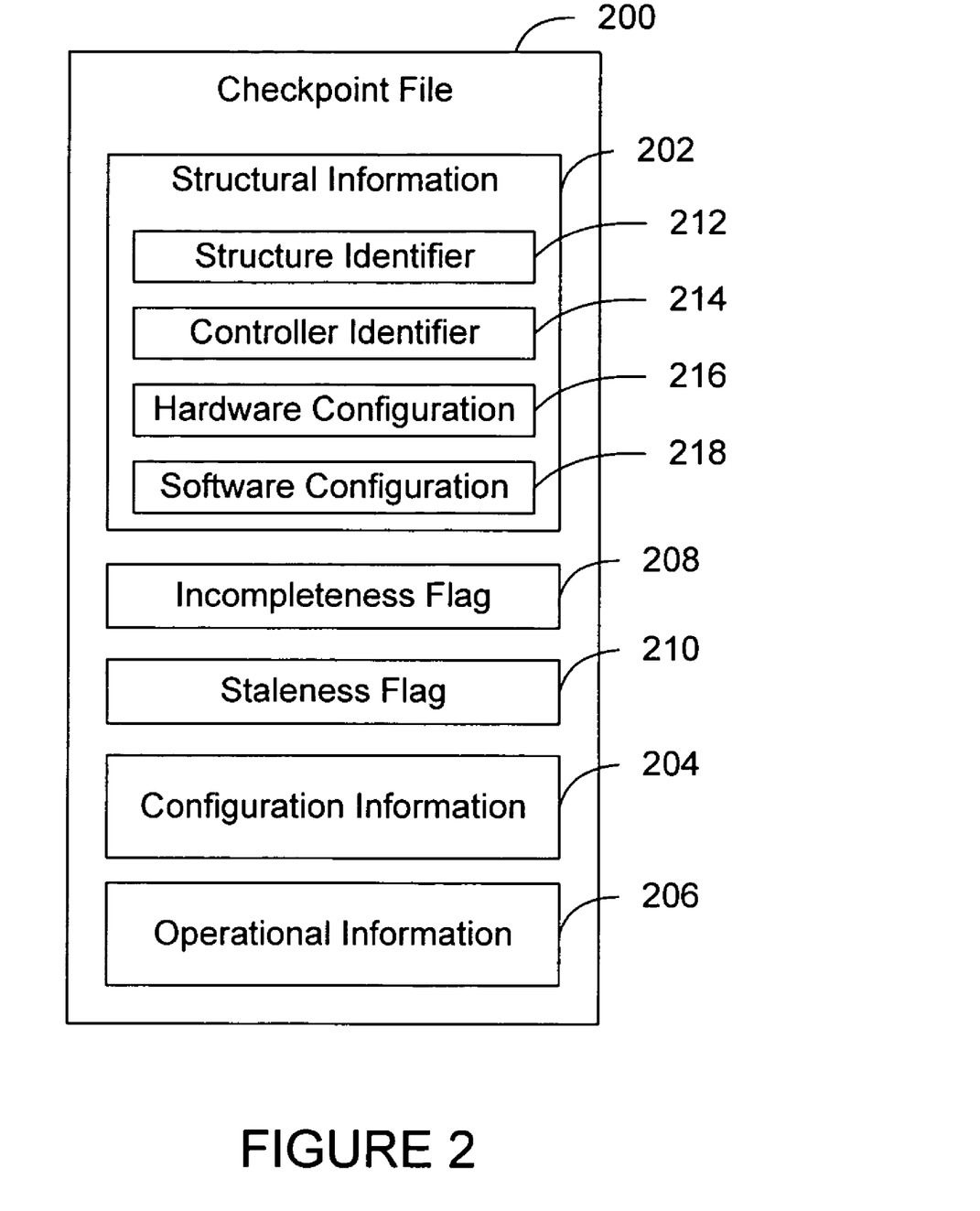
FIG. 2 illustrates an example checkpoint file according to one embodiment of this disclosure.

FIG. 2 illustrates an example checkpoint file 200 according to one embodiment of this disclosure. The checkpoint file 200 may include structural information 202 describing a structure of the system 100. The checkpoint file 200 may also include configuration information 204, describing a configuration of the process controller, and operational information 206, describing operational parameters of the process controller. The configuration information 204 may describe, for example, the configuration of control modules and control blocks within the process controller. The operational information 206 may describe, for example, set points, alarm points and gain (tuning) factors for the control blocks of the process controller.

The checkpoint file 200 may also include, as described in greater detail below, an incompleteness flag 208 and a staleness flag 210. The structural information 202 may include a structure identifier 212 and one or more of a controller identifier 214, a hardware configuration descriptor 216, and a software configuration descriptor 218.

The structure identifier 212 may be a unique identifier created when the structure of the system 100 is changed, for example when the monitor view presented by the user interface 110 is changed to reflect a change in the configuration of the process controller 102 or the process controller 106. The controller identifier 214 may be a unique identifier assigned to each of the process controllers 102 and 106 in the system 100. Inclusion of the controller identifier 214 in the checkpoint file 200 would enable the checkpoint system 112, for example, to prevent restoring the process controller 102 from a checkpoint file saved from the process controller 106, even if the controllers had identical configurations. Use of the controller identifier 214 also prevents restoring the process controller 102 or 106 from a checkpoint file created for an identically named process controller in a different process control system.

The hardware configuration descriptor 216 enables the checkpoint system 112 to confirm that the hardware and firmware of a process controller have not changed since a checkpoint file was stored before restoring the controller from the checkpoint file. Similarly, the software configuration descriptor 218 enables the checkpoint system 112 to confirm that the current software version numbers of the programs of a process controller are the same as those in place when a checkpoint file was saved.

Figure 3:
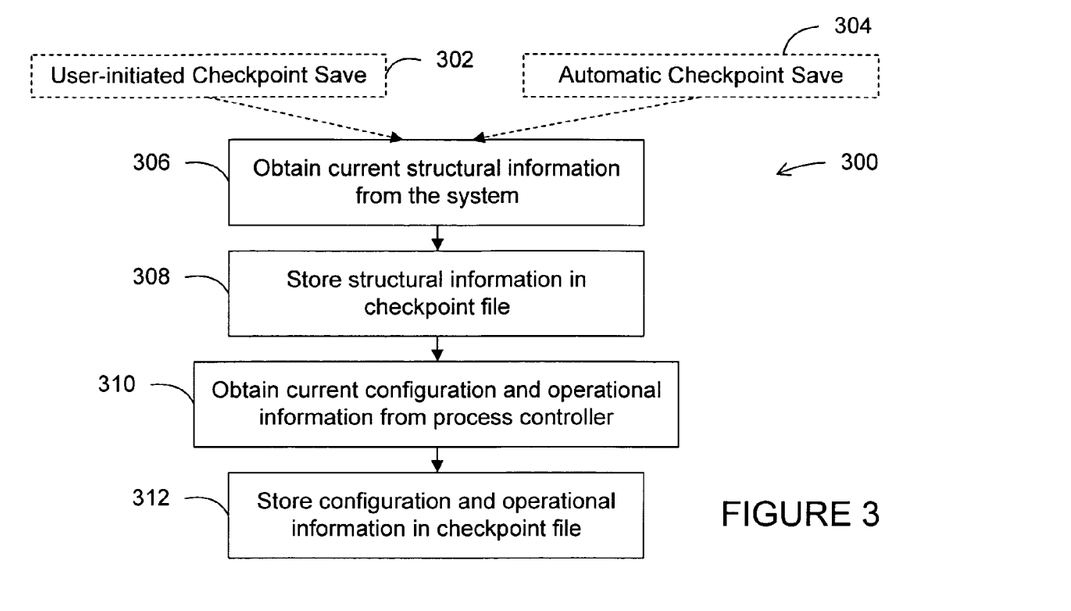
FIG. 3 illustrates an example method for saving a checkpoint file according to one embodiment of this disclosure.

FIG. 3 illustrates an example method 300 for saving a checkpoint file for a process controller according to one embodiment of this disclosure. The method 300 may be initiated in at least two ways. The operator of the system may initiate 302 the method 300, or the method 300 may be automatically initiated 304 by the system 100. The automatic initiation 304 may occur at a scheduled time, as part of the saving of checkpoint files for a predetermined list of process controllers, or in response to some other event in the system 100.

The method 300 continues in step 306 by obtaining from the system 100 its current structural information. In step 308, that structural information is saved in the checkpoint file being created. The current configuration and operational information for the process controller is obtained in step 310 and stored in the checkpoint file in step 312.

Figure 4:
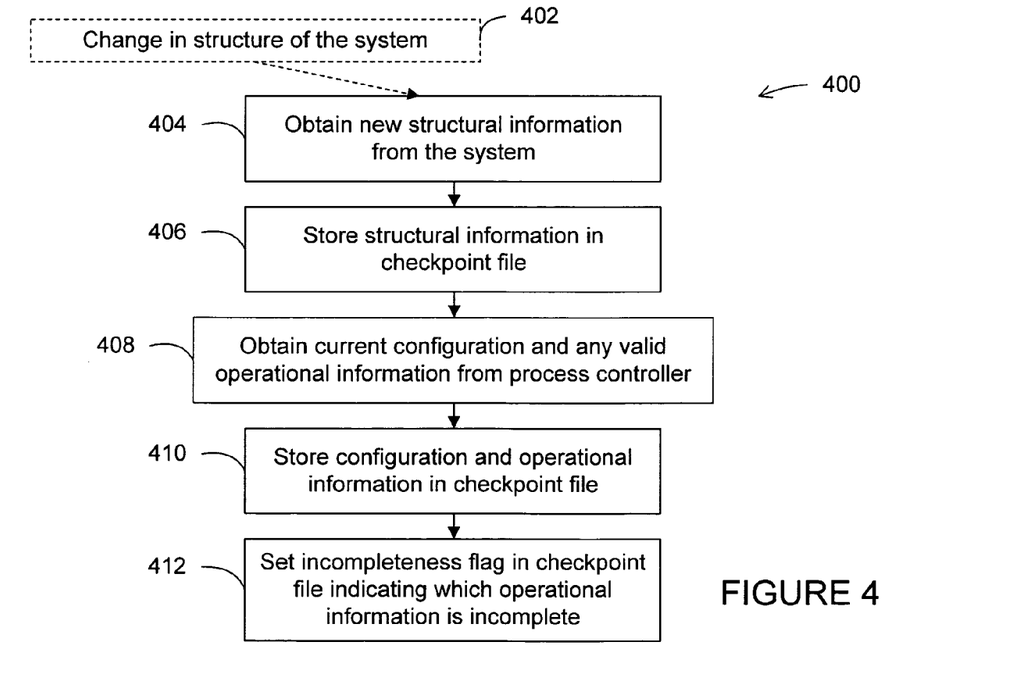
FIG. 4 illustrates another example method for saving a checkpoint file according to one embodiment of this disclosure.

FIG. 4 illustrates another example method 400 for saving a checkpoint file for a process controller according to one embodiment of this disclosure. The method 400 may be initiated 402 by a change in the structure of the system 100, possibly including a change in the configuration of the process controller. The new structure of the system 100 is obtained in step 404 and stored in a checkpoint file in step 406. Where the change to the structure of the system 100 also includes changes to the configuration of the process controller, some of the operational information for the controller may have been set to initial, default, values and not yet changed by the operator. For that reason, in step 408 of the method 400 the current configuration information and any valid operational information of the process controller are obtained. In step 410, the obtained configuration and operational information is stored in the checkpoint file. Finally, in step 412, the incompleteness flag of the checkpoint file is set, indicating which operational information of the checkpoint file is incomplete.

When an operator of system 100 selects a checkpoint file stored by method 400 to restore a process controller, the checkpoint system 112 may notify the operator that the incompleteness flag of the checkpoint file is set. The operator may then use a user interface of the checkpoint system 112 to examine which elements of the process controller would not have valid operational information if the checkpoint file were used. If the operator is willing to cold restart the indicated elements of the process controller restoring the controller from the selected checkpoint file may continue.

Figure 5:
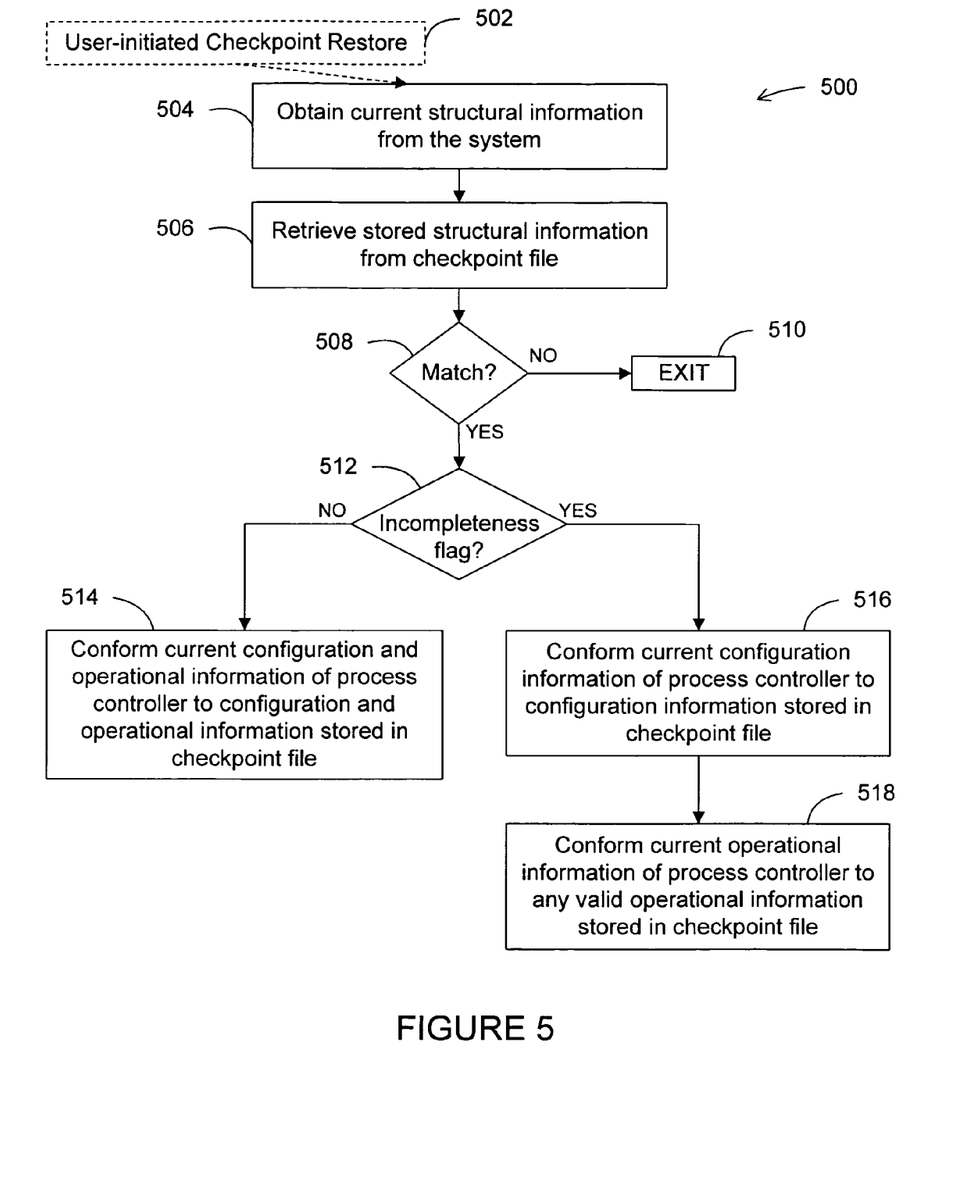
FIG. 5 illustrates an example method for restoring a process controller from a checkpoint file according to one embodiment of this disclosure.

FIG. 5 illustrates an example method 500 for restoring a process controller from a checkpoint file according to one embodiment of this disclosure. The method 500 is typically initiated 502 by the operator of the system 100 choosing a checkpoint file from which to restore a process controller. However, the removal and replacement of a process controller may also automatically initiate the method 500. In step 504, the current structural information for the system 100 is obtained. Typically, the current structural information is stored in a system repository. The system repository is often replicated on multiple computers throughout the system 100, so that it will be available even if one or more computers fail.

In step 506, the structural information stored in the checkpoint file is retrieved, and in step 508 the current and stored structural information are compared to determine whether they match. If they do not, the method 500 terminates at step 510, preventing the process controller from being restored from the selected checkpoint file. If the current and stored structural information match, the incompleteness flag of the checkpoint file is examined in step 512. If the incompleteness flag is not set, then in step 514 the current configuration and operational information of the process controller are conformed to the configuration and operational information stored in the checkpoint file and the method 500 terminates.

If the incompleteness flag in the checkpoint file is set, then in step 516 the current configuration information of the process controller is conformed to the configuration information stored in the checkpoint file. In step 518, the current operational information of the process controller is conformed to any valid operational information stored in the checkpoint file and the method 500 terminates. Valid operational information include may include information set by the operator or default/null information set in the process of changing the configuration of the process controller.

Figure 6:
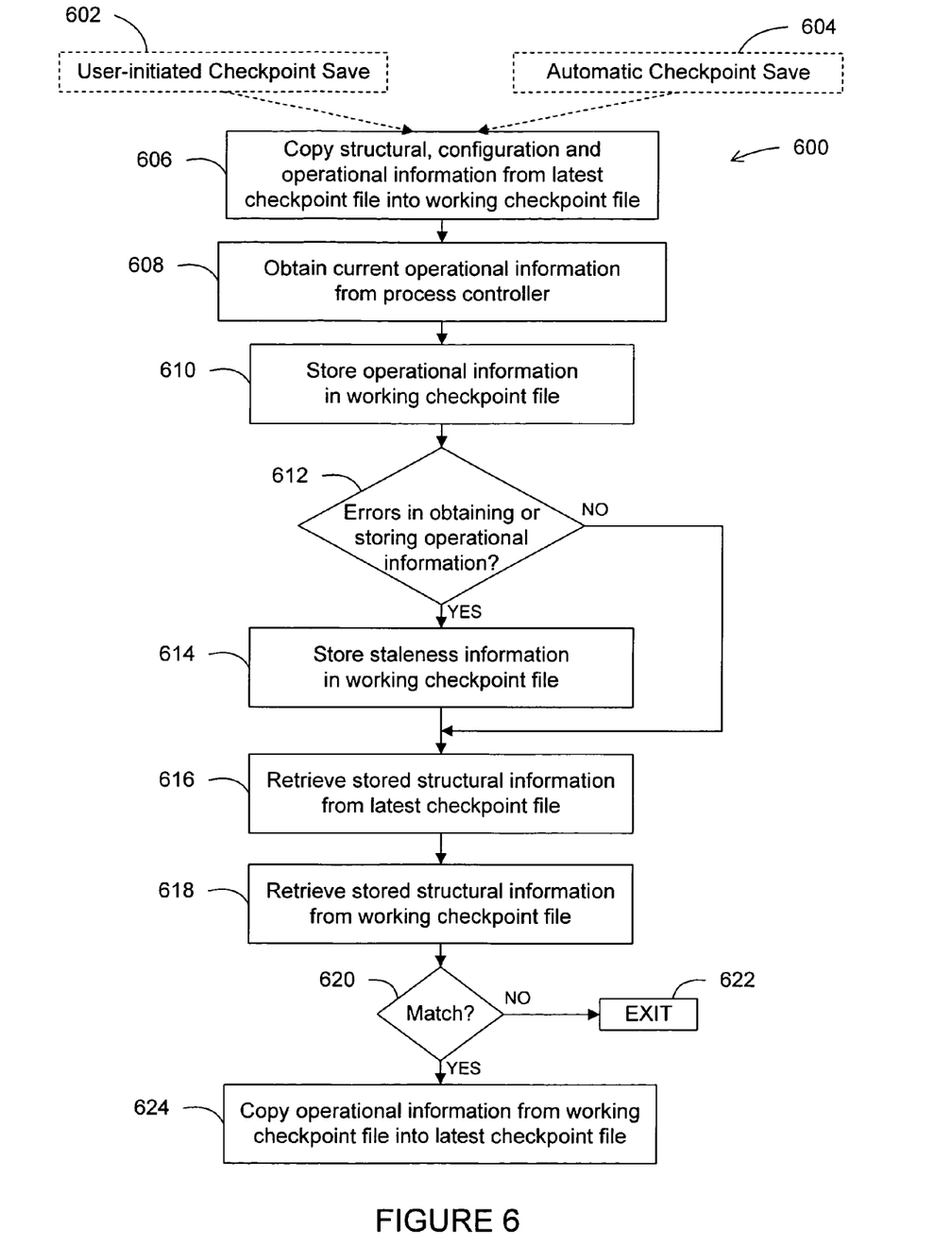
FIG. 6 illustrates yet another example method for saving a checkpoint file according to one embodiment of this disclosure.

FIG. 6 illustrates yet another example method 600 for saving a checkpoint file according to one embodiment of this disclosure. Like the method 300, the method 600 may be initiated 602 by the operator of the system 100, or the method 600 may be automatically initiated 604 by the system 100. The method 600 operates on the assumption that a most-recent checkpoint file exists (in this example called "Latest") having structural and configuration information matching the current structural and configuration information of the process controller. However, the operational information in the Latest checkpoint file may or may not still match the current operational information of the process controller.

The method 600 continues in step 606 by copying the structural, configuration and operational information from the latest checkpoint file into a new checkpoint file, referred to in this example as "Working." In step 608, the current operational information for the process controller is obtained, and in step 610 the obtained operational information is stored in the Working checkpoint file.

Where the process controller is implemented on two or more computers connected to each other and to the checkpoint system 112 by a communication network, the performance of the step 610 may require multiple messages over the communication network and last for a significant period of time. In such a circumstance, two eventualities may arise. First, communication errors may occur, resulting in operational data for some elements of the process controller not being obtained. Second, during the performance of the step 610, the operator of the system 100 may change the structure of the system 100. If the operator does this using a process independent from the checkpoint save process of the method 600, it may result in changes being made to the structural information in both the system repository and the Latest checkpoint file during the performance of the step 610.

Step 612 of the method 600 checks for the occurrence of the first eventuality. If any errors were encountered in obtaining operational information from elements of the process controller, then in step 614 staleness information is stored in the Working checkpoint file. The staleness information indicates that some elements of the process controller still have operational information copied from the Latest checkpoint file, referred to as "stale" operational information. If no errors were encountered, then all the operational information in the Working checkpoint file may be referred to as "fresh."

Whether or not errors were encountered in obtaining operational information for the process controller, the method 600 continues in step 616 by locking the Latest checkpoint file, to prevent changes from other processes, and then retrieving the structural information from the Latest checkpoint file. In step 618, the structural information from the Working checkpoint file is retrieved. If the second eventuality described above has occurred, and the structural information in the Latest checkpoint file has been changed, then the retrieved structural information may not match. In that case, the method 600 terminates in step 622, after unlocking the Latest checkpoint file to re-enable access by other processes. The Working checkpoint file just created is already incompatible with the new structure of the system 100.

However, if no changes were made to the structure of the system 100 during performance of the step 610, then in step 624 the operational information stored in the Working checkpoint file (whether stale or fresh) is copied from the Working checkpoint file into the Latest checkpoint file. After the operational information is copied, the Latest checkpoint file is unlocked to re-enable access by other processes. This brings the Latest checkpoint file up to date without the need for another time-consuming and possibly error-prone process of obtaining the current operational information for the process controller, as was performed in step 610.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   electronically obtaining current structural information describing a current structure of a process control system;
   electronically retrieving from a checkpoint file stored structural information describing a previous structure of the process control system;
   electronically retrieving from the checkpoint file previous configuration information and previous operational information of a controller in the process control system and any previous incompleteness information indicating that the previous operational information is incomplete;
   electronically conforming current configuration information of the controller to the previous configuration information only if the current structural information matches the stored structural information; and
   electronically conforming current operational information of the controller to the previous operational information only if the current structural information matches the stored structural information and depending on the previous incompleteness information.

2. The method of claim 1, wherein the current structural information comprises a structure identifier.

3. The method of claim 2, wherein the current structural information further comprises at least one of: an identity of the controller, information describing a hardware configuration of the controller, and information describing a software configuration of the controller.

4. The method of claim 1, further comprising:
   electronically storing in the checkpoint file the structural information describing the current structure of the process control system as the previous structure of the process control system; and
   electronically storing in the checkpoint file the current configuration information and the current operational information of the controller as the previous configuration information and the previous operational information.

5. The method of claim 4, wherein the structural information describing the current structure of the process control system and the current configuration information of the controller are stored in the checkpoint file in response to a change in the structure of the process control system, the method further comprising:
   electronically storing current incompleteness information in the checkpoint file as the previous incompleteness information indicating that the previous operational information stored in the checkpoint file is incomplete.

6. The method of claim 4, wherein:
   the checkpoint file is a first checkpoint file;
   the step of electronically storing the structural information describing the current structure of the process control system comprises electronically copying structural information from a second checkpoint file into the first checkpoint file; and
   the step of electronically storing the current configuration information and the current operational information of the controller comprises:
   electronically copying configuration information and operational information from the second checkpoint file into the first checkpoint file;
   electronically storing the current operational information of the controller in the first checkpoint file in place of corresponding operational information copied from the second checkpoint file; and
   if a portion of the current operational information is not stored in place of a corresponding portion of the operational information copied from the second checkpoint file, electronically storing staleness information in the first checkpoint file, the staleness information indicating that the portion of the current operational information was not stored.

7. The method of claim 4, wherein the checkpoint file is a first checkpoint file and the step of electronically storing the structural information describing the current structure of the process control system comprises electronically copying structural information from a second checkpoint file, the method further comprising:

after the step of electronically storing the current configuration information and the current operational information of the controller, electronically copying the operational information from the first checkpoint file into the second checkpoint file only if the structural information in the second checkpoint file still matches the structural information in the first checkpoint file.

8. The method of claim 1, wherein electronically conforming the current operational information of the controller to the previous operational information comprises:

electronically conforming the current operational information of the controller to the previous operational information when no previous incompleteness information is retrieved; and     electronically conforming none or some of the current operational information of the controller to the previous operational information when previous incompleteness information is retrieved.

9. An apparatus, comprising:

a memory storing a first checkpoint file, the first checkpoint file comprising (i) stored structural information describing a previous structure of a process control system, (ii) previous configuration information and previous operational information of a process controller in the process control system, and (iii) optional previous incompleteness information indicating that the previous operational information is incomplete; and     a checkpoint restore controller adapted to:

obtain current structural information describing a current structure of the process control system;

retrieve from the first checkpoint file the stored structural information;

conform current configuration information of the process controller to the previous configuration information only if the current structural information matches the stored structural information; and         conform current operational information of the process controller to the previous operational information only if the current structural information matches the stored structural information and depending on the previous incompleteness information.

10. The apparatus of claim 9, wherein the current structural information comprises a structure identifier.

11. The apparatus of claim 10, wherein the current structural information further comprises at least one of: an identity of the process controller, information describing a hardware configuration of the process controller, and information describing a software configuration of the process controller.

12. The apparatus of claim 9, further comprising a checkpoint save controller adapted to:

store in the first checkpoint file the structural information describing the current structure of the process control system as the previous structure of the process control system; and     store in the first checkpoint file the current configuration information and the current operational information of the process controller as the previous configuration information and the previous operational information.

13. The apparatus of claim 12, wherein:

the checkpoint save controller is further adapted to store current incompleteness information in the first checkpoint file as the previous incompleteness information indicating that the previous operational information in the checkpoint file is incomplete.

14. The apparatus of claim 12, wherein:

the memory further stores a plurality of checkpoint files; and     the checkpoint save controller is further adapted to:

copy structural information, configuration information, and operational information from a second checkpoint file into the first checkpoint file;

store the current operational information of the process controller in the first checkpoint file in place of corresponding operational information copied from the second checkpoint file; and         if a portion of the current operational information is not stored in place of a corresponding portion of the operational information copied from the second checkpoint file, store staleness information in the first checkpoint file, the staleness information indicating that the portion of the current operational information was not stored.

15. The apparatus of claim 12, wherein:

the memory is further stores a plurality of checkpoint files; and     the checkpoint save controller is further adapted to:

copy structural information, configuration information, and operational information from a second checkpoint file into the first checkpoint file,         store the current operational information of the process controller in the first checkpoint file in place of corresponding operational information copied from the second checkpoint file, and         if the structural information in the second checkpoint file still matches the structural information in the first checkpoint file, copy the operational information from the first checkpoint file into the second checkpoint file.

16. A system, comprising:

a process controller adapted to control one or more process elements in a facility; and     an apparatus, comprising:

a memory storing a first checkpoint file, the first checkpoint file comprising (i) stored structural information describing a previous structure of the system, (ii) previous configuration information and previous operational information of the process controller, and (iii) optional previous incompleteness information indicating that the previous operational information is incomplete; and         a checkpoint restore controller adapted to:

obtain current structural information describing a current structure of the system,             retrieve from the first checkpoint file the stored structural information describing a previous structure of the system,             conform current configuration information of the process controller to the previous configuration information only if the current structural information matches the stored structural information; and             conform current operational information of the process controller to the previous operational information only if the current structural information matches the stored structural information and depending on the previous incompleteness information.

17. The system of claim 16, wherein the current structural information comprises a structure identifier.

18. The system of claim 17, wherein the current structural information further comprises at least one of: an identity of the process controller, information describing a hardware configuration of the process controller, and information describing a software configuration of the process controller.

19. The system of claim 16, the apparatus of the system further comprising a checkpoint save controller adapted to:
store in the first checkpoint file the structural information describing the current structure of the system as the previous structure of the system; and
store in the first checkpoint file the current configuration information and the current operational information of the process controller as the previous configuration information and the previous operational information.

20. The system of claim 19, wherein:
the checkpoint save controller is further adapted to store current incompleteness information in the first checkpoint file as the previous incompleteness information indicating that the stored operational information in the checkpoint file is incomplete.

21. The system of claim 19, wherein:
the memory further stores a plurality of checkpoint files;
the checkpoint save controller is further adapted to:
copy structural information, configuration information, and operational information from a second checkpoint file into the first checkpoint file,
store the current operational information of the process controller in the first checkpoint file in place of corresponding operational information copied from the second checkpoint file, and
if a portion of the current operational information is not stored in place of a corresponding portion of the operational information copied from the second checkpoint file, store staleness information in the first checkpoint file, the staleness information indicating that the portion of the current operational information was not stored.

22. The system of claim 19, wherein:
the memory further stores a plurality of checkpoint files; and
the checkpoint save controller is further adapted to
copy structural information, configuration information, and operational information from a second checkpoint file into the first checkpoint file,
store the current operational information of the process controller in the first checkpoint file in place of corresponding operational information copied from the second checkpoint file, and
if the structural information in the second checkpoint file still matches the structural information in the first checkpoint file, copy the operational information from the first checkpoint file into the second checkpoint file.

23. A method, comprising:
electronically obtaining current structural information describing a current structure of a process control system;
electronically retrieving from a checkpoint file stored structural information describing a previous structure of the process control system;
electronically conforming current configuration information and current operational information of a controller in the process control system to previous configuration information and previous operational information stored in the checkpoint file when (i) the current structural information matches the stored structural information and (ii) incompleteness information in the checkpoint file indicates that the previous operational information stored in the checkpoint file is not incomplete; and
electronically conforming the current configuration information of the controller to the previous configuration information stored in the checkpoint file, without conforming the current operational information of the controller to the previous operational information stored in the checkpoint file, when (i) the current structural information matches the stored structural information and (ii) the incompleteness information in the checkpoint file indicates that the previous operational information stored in the checkpoint file is incomplete.

24. A method, comprising:
electronically obtaining current structural information describing a current structure of a process control system;
electronically retrieving from a first checkpoint file stored structural information describing a previous structure of the process control system;
electronically conforming current configuration information and current operational information of a controller in the process control system to previous configuration information and previous operational information stored in the first checkpoint file only if the current structural information matches the stored structural information;
electronically storing in the first checkpoint file the structural information describing the current structure of the process control system as the previous structure of the process control system; and
electronically storing in the first checkpoint file the current configuration information and the current operational information of the controller as the previous configuration information and the previous operational information;
wherein electronically storing the structural information describing the current structure of the process control system comprises electronically copying structural information from a second checkpoint file into the first checkpoint file; and
wherein electronically storing the current configuration information and the current operational information of the controller comprises:
electronically copying configuration information and operational information from the second checkpoint file into the first checkpoint file;
electronically storing the current operational information of the controller in the first checkpoint file in place of corresponding operational information copied from the second checkpoint file; and
if a portion of the current operational information is not stored in place of a corresponding portion of the operational information copied from the second checkpoint file, electronically storing staleness information in the first checkpoint file, the staleness information indicating that the portion of the current operational information was not stored.

25. A method, comprising:
electronically obtaining current structural information describing a current structure of a process control system;
electronically retrieving from a first checkpoint file stored structural information describing a previous structure of the process control system;
electronically conforming current configuration information and current operational information of a controller in the process control system to previous configuration information and previous operational information stored in the first checkpoint file only if the current structural information matches the stored structural information;

electronically storing in the first checkpoint file the structural information describing the current structure of the process control system as the previous structure of the process control system, wherein storing the structural information describing the current structure of the process control system comprises copying structural information from a second checkpoint file;

electronically storing in the first checkpoint file the current configuration information and the current operational information of the controller as the previous configuration information and the previous operational information; and electronically copying the operational information from the first checkpoint file into the second checkpoint file only if the structural information in the second checkpoint file still matches the structural information in the first checkpoint file.

* * * * *